US006139020A

United States Patent [19]
Friend et al.

[11] Patent Number: 6,139,020
[45] Date of Patent: Oct. 31, 2000

[54] TEXTURED SEAL

[75] Inventors: Anthony D. Friend; Alan M. Dickey, both of Peoria, Ill.

[73] Assignee: Caterpillar Inc., Peoria, Ill.

[21] Appl. No.: 09/028,317

[22] Filed: Feb. 24, 1998

Related U.S. Application Data

[60] Provisional application No. 60/039,641, Feb. 24, 1997.
[51] Int. Cl.[7] ..................................................... F16J 15/34
[52] U.S. Cl. ........................... 277/399; 277/924; 305/100
[58] Field of Search ............................. 425/556; 277/306, 277/307, 345, 399, 400, 402, 407, 465, 559, 574, 592, 593, 594, 639, 549, 924; 305/100, 103, 101, 105, 102

[56] References Cited

U.S. PATENT DOCUMENTS

| 2,006,602 | 7/1935 | Muster ..................................... 277/530 |
| 2,489,715 | 11/1949 | Mark, Jr. et al. . |
| 3,194,570 | 7/1965 | Haynie et al. ....................... 277/924 X |
| 3,572,730 | 3/1971 | Otto et al. . |
| 3,744,805 | 7/1973 | Heinrich . |
| 4,084,826 | 4/1978 | Vossieck et al. ......................... 277/559 |
| 4,157,833 | 6/1979 | Kozlowski ........................... 277/530 X |
| 4,219,205 | 8/1980 | Christiansen et al. ............... 277/924 X |
| 4,399,998 | 8/1983 | Otto . |
| 4,491,331 | 1/1985 | Salant et al. . |
| 4,560,174 | 12/1985 | Bisi . |
| 5,069,509 | 12/1991 | Johnson et al. . |
| 5,746,965 | 5/1998 | Sorensen et al. .................... 425/556 X |
| 5,873,576 | 2/1999 | Dietle et al. ............................. 277/559 |

FOREIGN PATENT DOCUMENTS 3437247  4/1986  Germany .

OTHER PUBLICATIONS

Rosato et al, Injection Molding Handbook, 2 ed., Chapman & Hall, New York, pp. 213, 214 & 604–607, Mar. 1995.

*Primary Examiner*—Lynne H. Browne
*Assistant Examiner*—Greg Binda
*Attorney, Agent, or Firm*—J. W. Burrows

[57] ABSTRACT

A seal is provided having a back surface that is generally perpendicular with a longitudinal axis of the seal and a sealing portion on the side opposite the back surface. The sealing portion is defined by first and second intersecting surfaces. A plurality of projections are disposed on one of the first and second surfaces at a location generally adjacent the intersection of the surfaces and a cylindrical recess is defined in at least a portion of the plurality of projections. The sides of the cylindrical recesses and the plurality of projections are oriented perpendicular to the back surface to enhance the ability to manufacture the seal in an economical manner.

5 Claims, 5 Drawing Sheets

Fig_2.
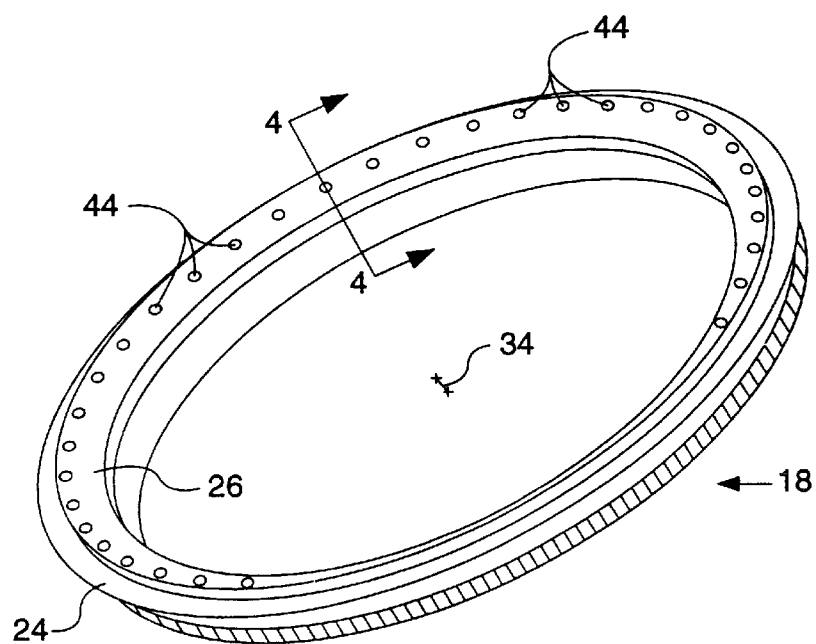
Fig_3.
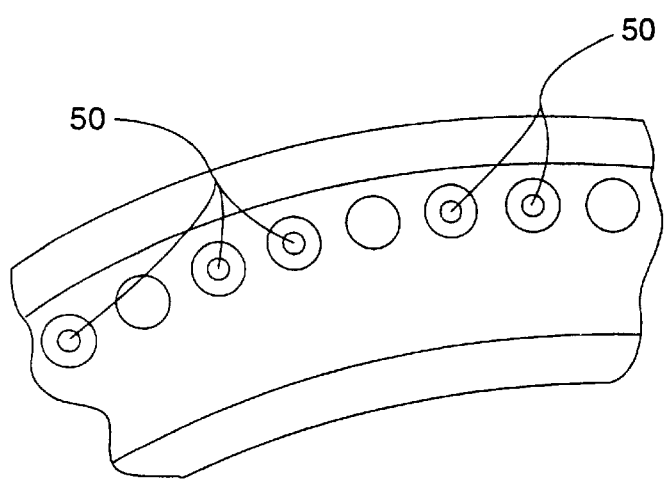

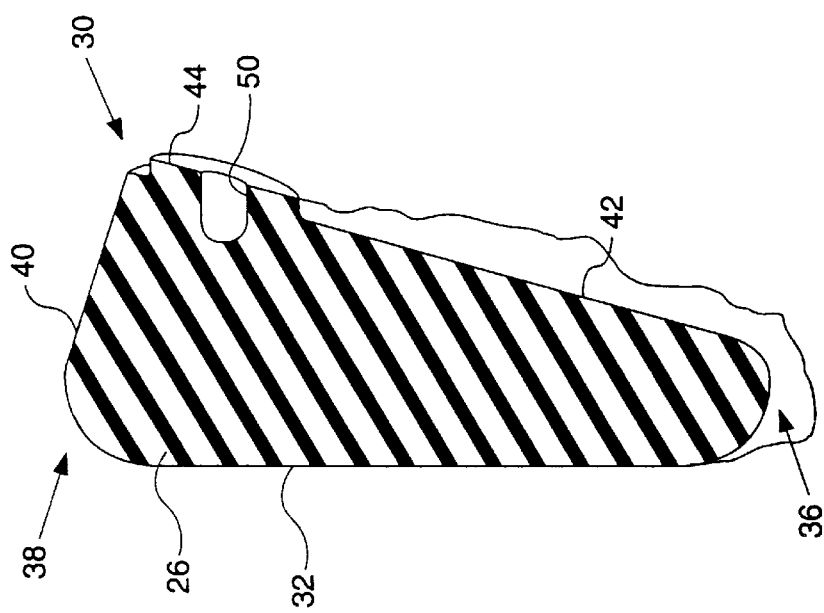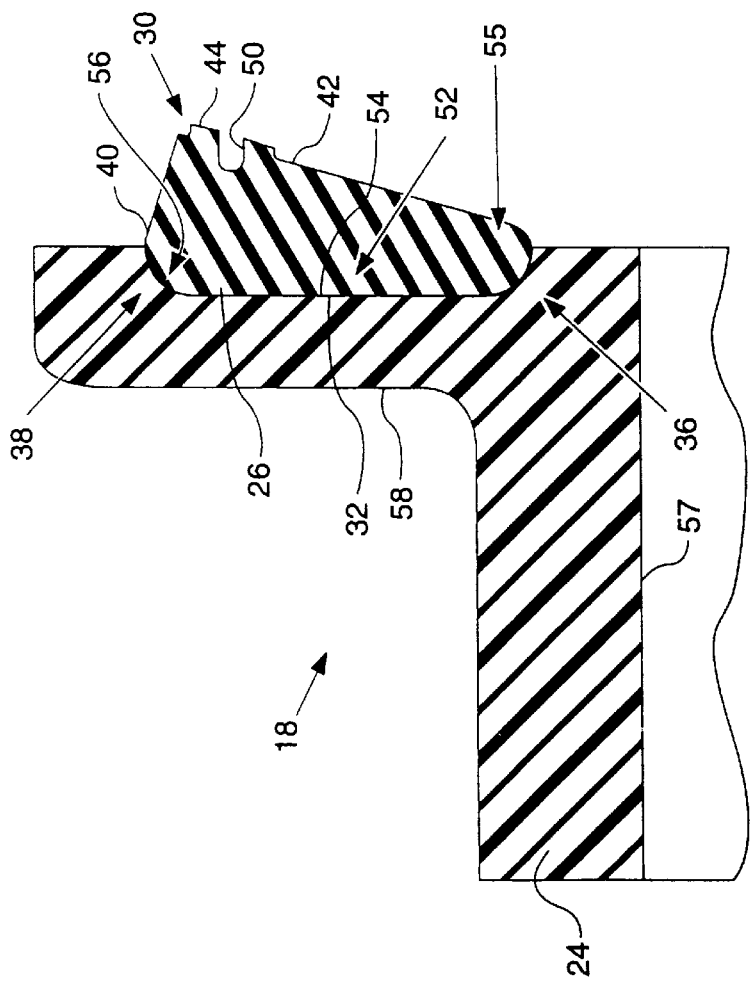

TEXTURED SEAL

CROSS REFERENCE TO RELATED APPLICATIONS

This application is based, in part, on the material disclosed in U.S. provisional patent application serial no. 60/039,641 filed Feb. 24, 1997.

TECHNICAL FIELD

The present invention relates generally to the structure of a seal and more particularly to the structure that enhances the ability to manufacture a seal having recesses defined on a surface thereof adjacent the sealing edge.

BACKGROUND ART

Axial seals have been used for sealing lubricated track joints on endless tracks of track-type machines and radial lip seals have been used on loader linkage lubricated pin joints to seal the oscillating pins of the various linkages. In relatively clean environments, a small amount of inward radial load is required on the sealing lip to seal in the bearing lubricant. As the operating environment becomes dirtier and more severe, higher lip loads are required to ensure good sealability and to keep the abrasive contaminants away from the bearing surfaces of such hinge or pin joints.

The track bushings used in endless tracks of earthworking machines and the radial lip seals used in the pin joints of the loader linkages of earthworking machines present one of the most severe operating environments possible for these kind of seals. In such extremely severe applications, a very high axial force or an inwardly directed radial force is desirable to prevent highly abrasive contaminants such as mixture of sand, dirt and water from not only entering the joint itself, but from becoming lodged under the seal lip. Any contaminants lodged under the seal lip quickly grinds or wears a groove into the pin/bushing and/or the seal and quickly wears out the seal lip and consequently the pin/bushing. This wear mechanism is responsible for many early hour joint failures which is detrimental to the components of the joint and causes downtime for the machine in order to repair or replace the components.

It is desirable to produce a seal that maintains the supply of lubricant within the lubricated joint while providing a seal that extends the useful life of the sealed joint. Various researchers in the fields of lubrication, surface analysis, materials science, and solid mechanics have studied the sealing mechanisms that allow a lubricating film to exist between the seal lip and the oscillating or rotating shaft without allowing leakage. It is desirable to economically produce a seal that has a unique texture on the sealing surface that would prevent the penetration of the abrasive contaminants into the seal lip or seal surface while improving the lubricating ability of the joint.

The present invention is directed to overcoming one or more of the problems set forth above.

DISCLOSURE OF THE INVENTION

In one aspect of the present invention a textured seal is provided and defines a longitudinal axis and has an outer peripheral portion, an inner peripheral portion, a back surface perpendicular with the longitudinal axis and a sealing portion having first and second intersecting surfaces disposed between the inner and outer peripheral portions. The textured seal includes a plurality of projections disposed on the second surface of the sealing portion at a location generally adjacent the point of intersection between the first and second surfaces and a cylindrical recess is defined in respective ones of at least a portion of the plurality of projections with each of the cylindrical recesses being oriented perpendicular with the back surface thereof.

The subject invention provides a seal having a sealing portion with a textured surface that is economical to provide and is effective in preventing excessive wear to the seal and/or the component that the sealing surface is in contact with. The construction of the subject seal is also effective to provide more lubricant at the sealing surface and eliminate leakage of the lubricant being sealed in the sealed joint.

BRIEF DESCRIPTION OF THE DRAWINGS

FIG. 2 is a diagrammatic representation of an embodiment of a seal assembly incorporating the subject invention;

FIG. 3 is an enlarged partial section taken from FIG. 2;

FIG. 4 is an enlarged cross-section taken along the line 4—4 of FIG. 2;

FIG. 5 is an enlarged cross-section of the sealing member;

BEST MODE FOR CARRYING OUT THE INVENTION

Figure 1:
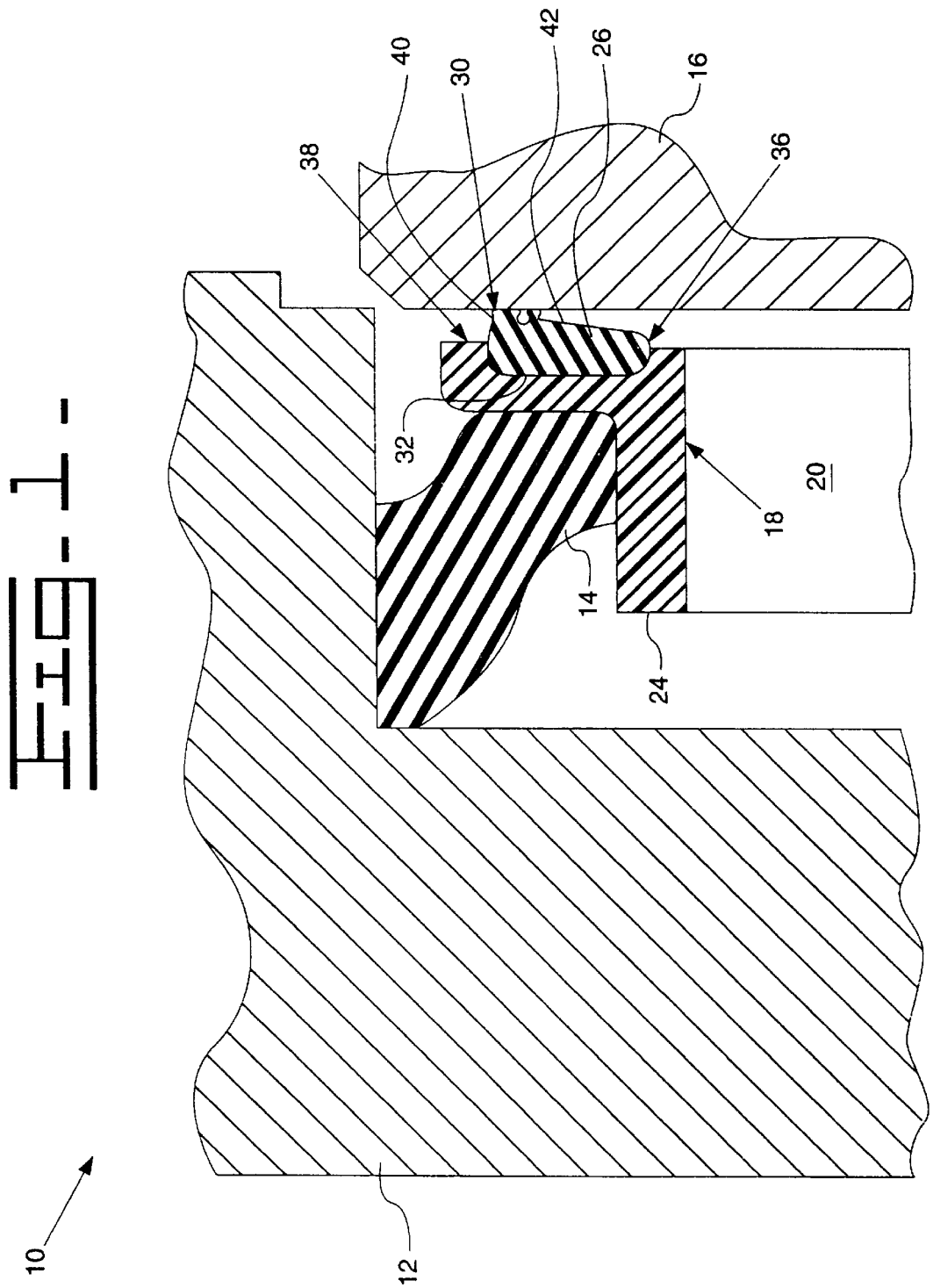
FIG. 1 is a diagrammatic representation of a typical arrangement using the seal of the subject invention.

Referring to FIGS. 1–3, a diagrammatic representation is illustrated of a track seal test arrangement 10. The track seal test arrangement includes a housing 12, an elastomeric biasing member 14, a pin or bushing 16 and a seal assembly 18. The elastomeric biasing member 14 urges the face of the seal assembly 18 against the end of the pin or bushing 16 to seal a chamber 20 that is filled with a lubricant.

The seal assembly 18 includes a mounting ring 24 and a textured seal 26. The mounting ring 24 is made of a polycarbonate material. However, it is recognized that the mounting ring 24 could be made of other types of materials without departing from the essence of the subject invention.

The textured seal 26 is made of a polyurethane material but it is recognized that the textured seal 26 could be made of various types of elastomeric materials. The textured seal 26 has a sealing portion 30, an opposed back surface 32 that is flat and perpendicular with a longitudinal axis 34, an inner peripheral portion 36 and an outer peripheral portion 38. The sealing portion 30 includes first and second intersection surfaces 40,42. As more clearly illustrated in FIG. 2, the seal assembly 18 is generally circular in shape and has a plurality of projections 44 disposed on the second surface 42 generally adjacent the point of intersection of the first and second surfaces 40,42. As illustrated, the plurality of projections 44 are equally spaced from one another circumferentially around the second surface 42.

As illustrated in FIG. 3, at least a portion of the plurality of projections 44 has recesses 50 defined therein. Preferably all of the projections have a recess 50 defined therein. Even though each of the projections 44 and recesses 50 are illustrated as being round, it is recognized that they could have various shapes, such as square, rectangular, triangular, elliptical, or any other multi-sided shaped without departing from the essence of the subject invention.

Referring to FIGS. 4 and 5, a cross-section of the seal assembly 18 and the textured seal 26 are illustrated in more detail. The mounting ring 24 has a recess 52 defined by a flat surface 54, an inner peripheral portion 55, and an outer peripheral portion 56. The flat surface 54 is perpendicular to an inner peripheral surface 57 and parallel with a radial surface 58.

As illustrated, the recess 52 of the mounting ring 24 receives the textured seal 26. The textured seal 26 may be formed separate from the mounting ring 24 as illustrated in FIG. 5 and then mounted and bonded in place or the textured seal 26 may be formed in place by any known molding process. From a review of the drawings of FIGS. 4 and 5, it is clear that the longitudinal length of the cylindrical recess 50 is perpendicular to the back surface 32 of the textured seal 26 and to the flat surface 54 of the recess 52. Likewise, the sides of the plurality of projections 44 are oriented parallel to the sides of the cylindrical recesses 50 and perpendicular to the back surface 32.

Figure 6:
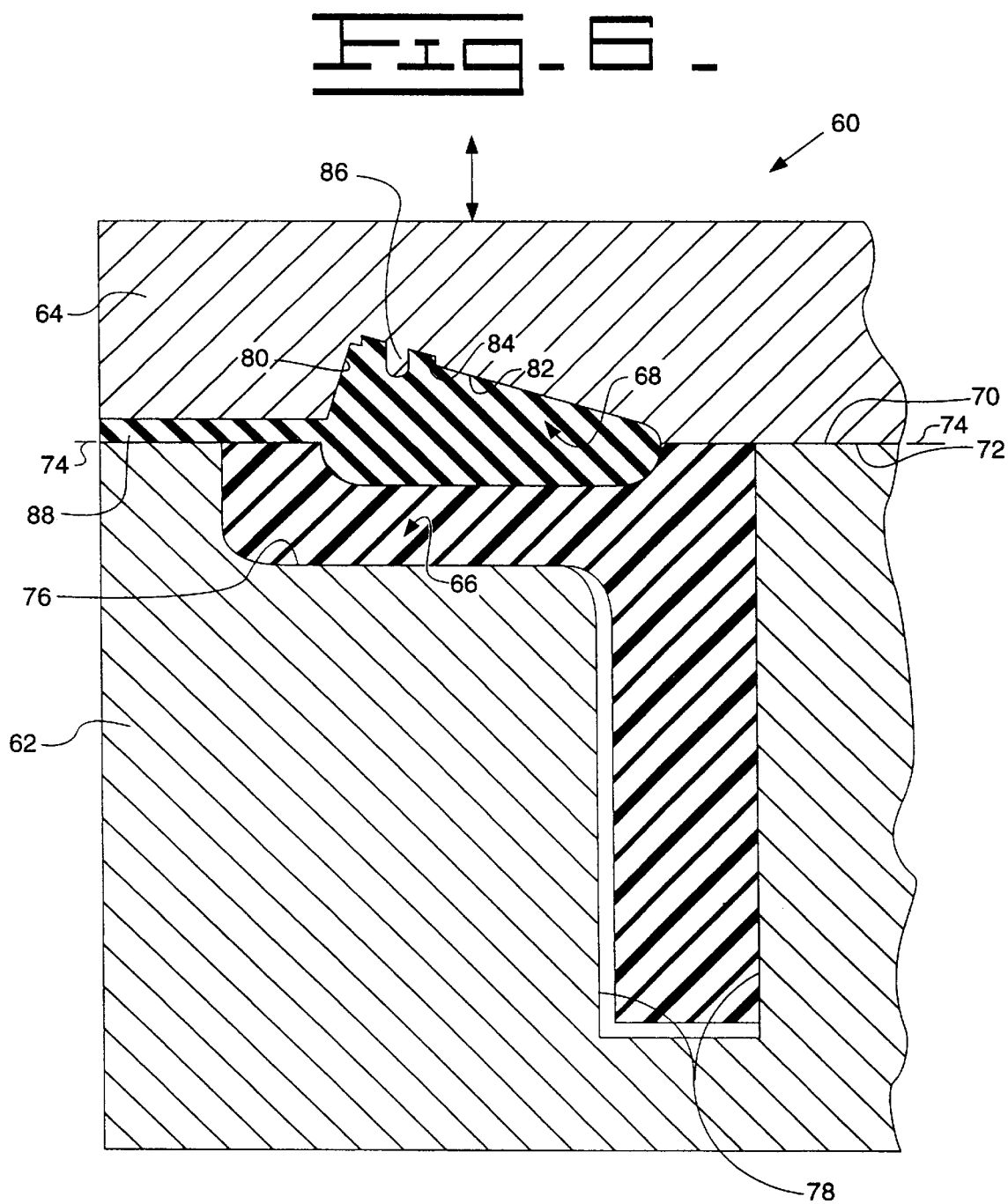
FIG. 6 is a diagrammatic representation of an injection mold die used to produce one embodiment of the seal assembly.

Referring to FIG. 6, an injection molding die 60 is diagrammatically illustrated and adapted for producing the seal assembly 26. The die 60 includes first and second halves 62, 64 and each half defines respective cavities 66,68 therein with adjacent flat surfaces 70,72. A parting line 74 is defined at the juncture of the respective flat surfaces 70,72. The cavity 66 in the first die half 62 is defined by at least a flat surface 76 that is spaced from and parallel with the adjacent flat surface 70 and a pair of spaced apart flat surfaces 78 that is perpendicular to the flat surface 70. The cavity 66 is adapted to receive the mounting ring 24 during the process of forming and bonding the textured seal 26 to the mounting ring 24.

The cavity 68 is defined by a first surface 80 extending inwardly from the adjacent flat surface 72 and a second intersecting surface 82 that extends generally to a point adjacent the flat surface 72. The second surface 82 forms an obtuse angle with the flat surface 72. In the subject arrangement, the intersection of the first and second surfaces 80,82 forms a right angle. As will be illustrated more clearly hereinafter in FIG. 8, a plurality of recesses 84 are defined in the cavity 68 extending inwardly from the second surface 82 at a location generally adjacent the point of intersection of the first and second surfaces 80,82. The sides of each of the plurality of recesses 84 are oriented parallel to the sides of the respective projections 86 and perpendicular to the parting line 74. The plurality of recesses 84 are operative during the making of the textured seal 26 to form the respective ones of the plurality of projections 44.

Additionally, as will be illustrated more clearly hereinafter in FIG. 8, a cylindrical projection 86 extends outwardly from each of at least a portion of the recesses 84. Each of the cylindrical projection 86 extend in a direction perpendicular to the parting line 74. The cylindrical projections 86 are operative during the making of the textured seal 26 to form the respective recesses 50.

An injection passage 88 is provided in one of the first and second die halves 62,64 in a well known manner. In the subject embodiment, the injection passage 88 is illustrated as being in the second die half 64.

Figure 7:
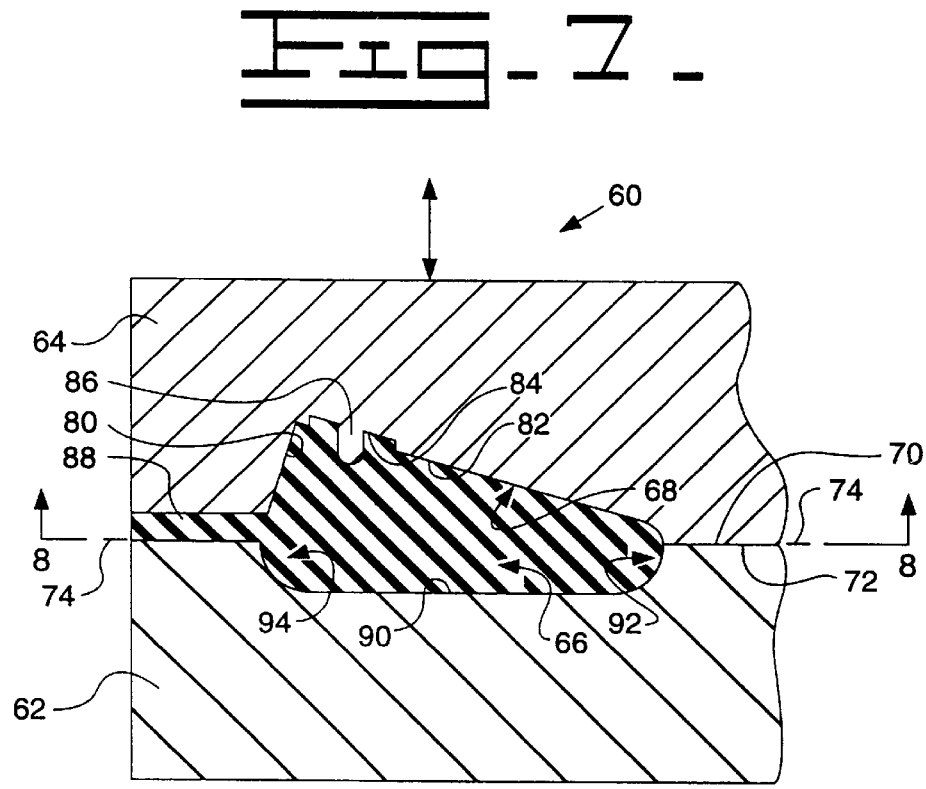
FIG. 7 is a diagrammatic representation of an injection mold mechanism used to produce the sealing member.

Referring to FIG. 7, another embodiment of the injection molding die 60 is illustrated and adapted for producing the textured seal 26. Like elements have like element numbers. The cavity 66 of the first die half 62 of the subject embodiment is defined by a flat surface 90 spaced from and parallel with the adjacent flat surface 70, an inner peripheral portion 92 extending from the flat surface 90 to the adjacent flat surface 70, and an outer peripheral portion 94 extending from the flat surface 90 to the adjacent flat surface 70.

The cavity 68 in the second die half 64 is the same as that described with respect to FIG. 6, consequently no further description is needed.

Figure 8:
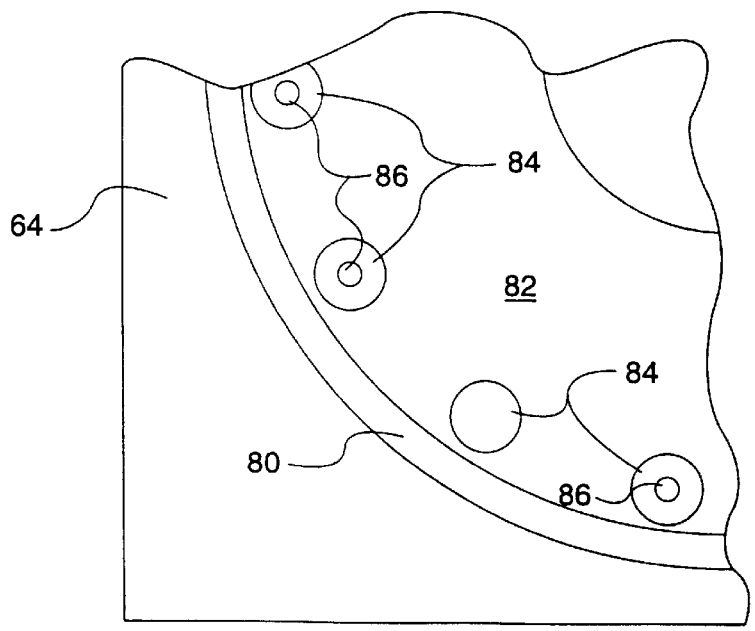
FIG. 8 is a partial view of one of the die halves the injection molding die taken along the line 8—8 of FIG. 7 with the sealing member removed.

Referring to FIG. 8, a portion of the cavity 68 in the second die half 64 is illustrated. As noted above, the cavity 68 is the same in each of the embodiments illustrated and described with respect to FIGS. 6 and 7, therefore the following description applies to both of the embodiments noted above.

As clearly described above, the plurality of recesses 84 illustrated herein extend inwardly from the second surface 82 and the cylindrical projections 86 extend outwardly from at least a portion of the respective recesses 84. As previously noted, the cylindrical projections 86 extend outwardly in a direction perpendicular to the parting line 74.

INDUSTRIAL APPLICABILITY

During use of the seal assembly 18 as set forth in FIGS. 1–5, the portion of the textured seal 26 at the point of intersection of the first and second surfaces 40,42 thereof is pressed against the surface of the element 16 to be sealed. The element to be sealed could be various elements, such as the end of a pin or bushing used in track link pin joints or loader linkage pin joint. At the same time, a portion of the respective plurality of projections 44 is also being deformed by the force. As the seal 26 and the element 16 to be sealed oscillates back and forth with respect to each other, the plurality of projections 44 act to redirect incoming dirt and debris into a low pressure area so that they do not collect at the area of contact of the seal 26 with the element 16 to be sealed. The respective recesses 50 in the plurality of projections serve as reservoirs for the lubricating fluid and act to continuously distribute the lubricating fluid to the area of seal contact as the elements oscillate with one another.

As illustrated in FIG. 6, during the making of the seal assembly 18, the mounting ring 24 is placed in the cavity 66 of the first half 62 of the die 60, the adjacent flat surface 72 of the second die half 64 is moved into sealing contact with the adjacent flat surface 70 of the first die half and the elastomeric material of the seal is injected into the closed chamber to form the textured seal 26 and bond it to the mounting ring 24. The first and second die halves 62,64 are separated and the finished seal assembly 18 is removed. Since the cylindrical projections 86 extending from the recesses 84 of the second die half are oriented perpendicular with the parting line 74, the cylindrical projections easily slip from the recesses 50 of the textured seal 26. By having the cylindrical projections 86 perpendicular with the parting line 74, wear and breaking stresses on the cylindrical projections 86 are substantially eliminated.

As shown in FIG. 7, when making the textured seal 26 separate from the mounting ring 24, the first and second die halves 62,64 are forced together and the elastomeric material is injected into the closed chamber. Once the elastomeric material has solidified, the die halves are separated and the textured seal 26 is removed. As noted above with respect to FIG. 6, since the cylindrical projections 86 are oriented perpendicular to the parting line 74, the cylindrical projections are easily removed from the formed recesses 50. If the textured seal is made separately from the mounting rings 24, it is subsequently mounted in the recess 52 of the mounting ring 24 and bonded thereto in any conventional manner.

In view of the above, it is readily apparent that a textured seal 26 is provided that is economical to produce and effective to increase the life of a seal, even when used in harsh operating conditions.

Other aspects, objects and advantages of this invention can be obtained from a study of the drawings, the disclosure and the appended claims.

What is claimed is:

1. A textured seal defining a longitudinal axis and having an outer peripheral portion, an inner peripheral portion, a back surface perpendicular with the longitudinal axis and a sealing portion having first and second intersecting surfaces disposed between the inner and outer peripheral portions, the textured seal comprising:

a plurality of projections disposed on the second surface of the sealing portion at a location generally adjacent the point of intersection between the first and second surfaces, the second surface of the sealing portion forming an acute angle with the back surface; and a cylindrical recess defined in respective ones of at least a portion of the plurality of projections, each of the cylindrical recesses being oriented perpendicular with the back surface.

2. The textured seal of claim 1 wherein the first and second surfaces of the sealing portion are perpendicular with each other.

3. The textured seal of claim 2 wherein the sides of the plurality of projections are oriented perpendicular to the back surface.

4. A textured seal defining a longitudinal axis and having an outer peripheral portion, an inner peripheral portion, a back surface perpendicular with the longitudinal axis and a sealing portion having first and second intersecting surfaces disposed between the inner and outer peripheral portions, the textured seal comprising:

a plurality of projections disposed on the second surface of the sealing portion at a location generally adjacent the point of intersection between the first and second surfaces, the sides of the plurality of projections being oriented perpendicular to the back surface, the first and second surfaces of the sealing portion being perpendicular to each other and the second surface of the sealing portion forms an acute angle with the back surface.

5. The textured seal of claim 4 including a cylindrical recess defined in respective ones of at least a portion of the plurality of projections, each of the cylindrical recesses being oriented perpendicular with the back surface.

* * * * *